March 9, 1937. O. HORSRUD 2,073,210
GUN SIGHT MOUNT
Filed Jan. 11, 1936
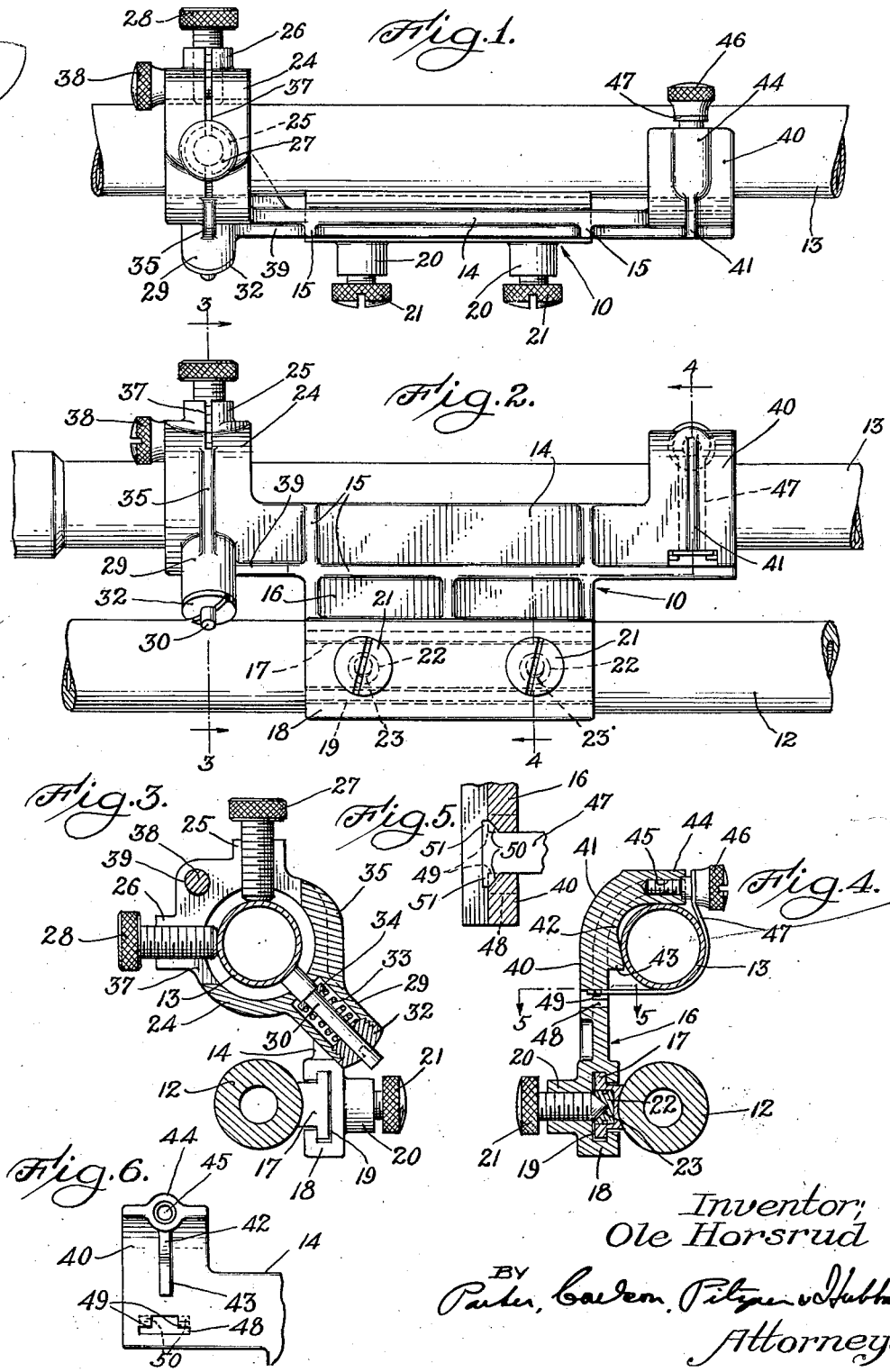
Inventor;
Ole Horsrud
BY Parker, Carlson, Pitzner & Hubbard
Attorneys.

Patented Mar. 9, 1937

2,073,210

UNITED STATES PATENT OFFICE 2,073,210

GUN-SIGHT MOUNT

Ole Horsrud, Chicago, Ill., assignor to Sears, Roebuck and Co., Chicago, Ill., a corporation of New York Application January 11, 1936, Serial No. 58,618

12 Claims. (Cl. 33—50)

This invention relates to an improved gun-sight mount, and more particularly concerns a mount which is adapted to support a telescope sight fixedly in any selected position of adjustment relative to the gun on which the sight is mounted.

Mounts of this type have heretofore been constructed of a number of separately fashioned pieces assembled together into one or more units to provide front and rear supports for the telescope sight. Due to this characteristic construction the mounts have been expensive, heavy and complicated in use and in application thereof to a gun. Frequently the recoil of the gun as well as other causes will loosen a joint and cause disarrangement of the sight. A part of the mount will often be dislodged accidentally and be lost; or the user in cleaning the mount may disassemble the same and lose a part, thereby rendering the entire mechanism useless. In prior constructions, moreover, different types of mount have been necessary for the various types of gun. For example, the mounts for large caliber rifles which are subject to severe recoil have been too heavy and costly for use with small bore rifles. Generally, also, differences in the action mechanism of the gun have governed the type of mount to be employed, a bolt action rifle, for example, taking a different mount than rifles with other types of action.

A principal object of the present invention, therefore, is to provide a telescope gun-sight mount characterized by a sturdy yet exceptionally simple, light-weight and compact construction, and adapted for use with many types of gun.

More specifically stated, an object of the invention resides in the provision of a complete and highly efficient gun-sight mount of the foregoing character embodying an integral frame equipped with a small number of simple accessory parts and attachable easily and quickly in a preferred position on the gun.

Another object is to provide a telescope gun-sight mount in which the frame carries as an integral part thereof means for securing the mechanism to a base attached to the receiver of the gun, and other relatively spaced and basically integral parts for supporting the telescope sight in position for use, the rear end of the telescope sight being supported in a relatively fixed but pivotal manner adjacent the action mechanism of the gun and the front end of the telescope sight being adjustably supported for elevation and windage corrections.

Another object is to provide an improved gun-sight mount of this character having an adjustable support for one end of the telescope sight and an improved pivotal support for the opposite end of the telescope sight, and in which the latter support embodies an improved structure including an integral and stationary cradle arranged to engage the telescope sight at circumferentially spaced pivot points and a flexible clamp for securing the telescope sight in the cradle.

Another object resides in the improvements in construction and relationship of parts by which the foregoing and other objects and advantages of the invention may be carried into practice simply and economically.

Other objects and advantages will become apparent from the following description taken in connection with the accompanying drawing, in which:

Figure 1 is a plan view of a mount embodying the principles of the invention.

Fig. 2 is a side elevational view of the mount.

Fig. 3 is a sectional elevational view taken substantially along line 3—3 of Fig. 2.

Fig. 4 is a sectional elevational view taken substantially along line 4—4 of Fig. 2.

Fig. 5 is a fragmentary sectional plan view taken substantially along line 5—5 of Fig. 4, and on a slightly enlarged scale.

Fig. 6 is a fragmentary side elevational view looking toward the cradle provided by the rear telescope sight support of the mount.

By way of example, I have shown herein and will describe in detail a practical embodiment of the invention, comprising a frame indicated generally by the numeral 10, carrying at its opposite sides means, to be more fully described hereinafter, for respectively attaching the mount to a gun barrel 12 and for supporting a telescope sight 13 in overlying relation to the gun. The frame 10 is preferably formed as a substantially flat, elongated plate 14 adapted to be supported longitudinally along one side of the gun. A light but very strong structure may be attained by making the plate relatively thin and providing the same with suitable reinforcing ribs 15, which interconnect and strengthen the parts of the frame.

Preferably the mount is so attached to the receiver of the gun that the telescope sight 13 is centrally supported. With this end in view, the plate 14 may have a support 16 integrally along the central part of the side which is lowermost when the mount is in position. To the receiver of the gun 12, and preferably longitudinally along the left side of the gun when in shooting position, is secured in any desirable manner an elongated base 17 comprising a bar of substantially T-shaped cross-section. The length of this base 17 is preferably substantially equal to the width of the frame support 16, and the latter has integral therewith a base opposing part 18 provided with a complementary groove 19 to receive the base snugly. The opposing part 18 has a pair of longitudinally spaced bosses 20, the axes of which extend perpendicularly to the outer face of the base 17. The bosses threadedly support tightening screws 21 which may be hardened and tapered at their inner ends. Substantially equally spaced on opposite sides of its vertical center line the base 17 may have a pair of similar hardened inserts 22 which are provided with outwardly opening tapered counterbores 23. The total spacing between the centers of the counterbores is similar to the spacing between the axes of the bosses 20 but a slight relative offset or eccentric relation is provided so that the tapered ends of the screws 21 will fit in the counterbores with a wedging action and effectively lock the opposing part 18 on the base. The hardened character of the inserts and the screws permits great tightening pressure of the screws without causing wear of the parts and consequent looseness. As will be observed, therefore, the frame may easily be mounted upon or removed from the gun by sliding the opposing part 18 onto or off of the base 17. The length of the base positively prevents endwise tilting of the frame, and when the screws 21 have been tightened into the slightly offset counterbores 23 in the base, the frame will be locked and clamped rigidly against relative movement or displacement due to recoil of the gun or other causes.

In the present instance, provision is made for windage and elevation adjustments near the front end of the telescope sight so that the adjusting devices, particularly that for windage, will not interfere with manipulation of the action mechanism of a gun, such as the bolt or the like when the device is attached to a gun of that type. Accordingly, I provide a loop 24 formed integrally with the forward end of the frame, and offset transversely from the longitudinal line of the frame into overlying relation to the gun barrel 12. This loop is of greater inside diameter than the telescope sight 13 and carries means for adjustably receiving and supporting the front end of the telescope sight. Thus, the loop has a circumferentially spaced pair of perpendicularly related hubs 25 and 26 which are threadedly bored with substantially micrometer precision to receive elevation and windage adjustment screws 27 and 28, respectively. On an axis medially intersecting the axes of the hubs 25 and 26, is a hollow boss 29 enclosing a plunger 30. The plunger projects at its inner end through the wall of the loop and engages the telescope sight to maintain the latter in abutment with the adjusting screws 27 and 28. An axially bored and externally threaded nut or cap 32 may be fitted into the outer end of the boss 29 about the outer end of the plunger 30 for maintaining a coil spring 33 under tension, in order to urge the plunger yieldably toward the telescope sight by pressure against a collar 34 on the plunger. The boss 29 is strengthened and reinforced against being accidentally broken off by a circumferential reinforcing rib 35 on the loop and by an end 39 of one of the plate reinforcing ribs 15 which merges with the body of the boss.

If desired, the loop 24 may be partially severed along a radial plane to provide a slot 37 through the portion carrying the bosses 25 and 26. Upon moving the severed portions of the loop toward one another, as by tightening a screw 38 which extends through and is threaded in one end of a transverse bore 39 that passes through the severed parts, the adjustment screws 27 and 28 will be maintained permanently in any condition of adjustment.

The rear end of the telescope sight 13 is supported relatively fixedly and pivotally by means forming an integral part of the frame 10. As seen in Figs. 1, 2, and 4, the frame carries a relatively thin, flattened arm 40 extending arcuately upwardly and laterally into overlying relation to the gun. Medially along the rear face of the arm is provided a reinforcing rib 41, while the inner face of the arm opposite the rib 41 is furnished with a thin rib 42 terminating at its lower end in a flaring projection 43. In a vertical plane with and formed as an extension of the ribs 41 and 42 at the upper end of the arm is an annular boss 44 which has a greater diameter than the thickness of the arm so as to lie partially above and partially below the outer and inner faces, respectively, of the arm. The boss has a threaded bore 45, which has its axis parallel with the axis of the slide tightening screws 21, and which is adapted to receive a clamp tightening screw 46. The latter screw passes through a suitable aperture in one end of a yieldable band clamp 47 by which the telescope 13 is secured in place on the arm. At its opposite or lower end, the clamp projects through a slot 48 which is formed near the base of the arm 40 and has a pair of inwardly projecting shoulders 49 which are spaced apart a distance slightly more than the width of the clamp. Horizontal grooves 50 are formed in the shoulders 49 and are adapted to receive lateral flanges 51 on the lower end of the clamp. In this manner the lower end of the clamp may easily be inserted into the slot from the cradle side of the arm 40 and the slotted shoulders 49 will then retain the clamp in place so that pressure may be applied by the clamp against the telescope sight upon tightening the screw 46.

As will be observed in Figs. 4 and 6, the rear end of the telescope is supported by the cradle arm for substantially universal pivotal movement during adjustments of the front end of the instrument. The flaring rib projection 43 and the inner annular portion of the boss 44 form a stationary, downwardly opening cradle adapted for snugly receiving telescopes of variable diameters, and contact between the cradle and the wall of the telescope will be at limited points circumferentially spaced ninety degrees, more or less. The narrow edge of the projection 43 permits the rear end of the telscope to pivot when the front end of the telescope is moved laterally for windage corrections, and the annular surface of the boss permits vertical pivotal movement of the rear end of the telescope during elevational corrections. While pivoting on either contact point, the remaining contact point offers only inconsequential frictional resistance; and the yieldable clamp 47 conforms readily with any adjusted angle of the telescope sight.

From the foregoing it will be apparent that I have provided a telescope gun-sight mount of exceptionally simple, durable and compact construction which embodies a minimum number of coacting parts and may be manufactured and sold at low cost. The mount, moreover, is highly efficient in operation, may easily be adjusted for elevational or windage corrections, and will maintain the sight permanently and accurately in any adjusted position. Another advantage of the mount resides in its ready adaptability to many types of gun without alterations in structure or variations in operation.

I claim as my invention:

1. The combination in a telescope sight mount, comprising a base adapted to be secured to the receiver of a gun and providing a track disposed parallel with relation to the axis of the gun bore, a frame fashioned as one integral piece including a plurality of parts, one of said parts including means in engagement with said base and slidable into position along said track, two other parts extending laterally from the frame into overlying relation to the gun, one of said two parts comprising an arm arranged to overlie the receiver of the gun when the mount is assembled thereon and having a movable clamp for securing one end of a telescope sight to said arm, the remaining of said two parts being a split-ring loop adapted to support the opposite end of the telescope sight and including means for adjusting the telescope sight with respect to elevation and windage.

2. The combination in a telescope gun-sight mount, comprising a base, a frame including a part in engagement with said base, a screw passing through said part and having its axis perpendicular to said base for securing the frame fixedly in position on said base, the forward end of said frame including means integral therewith projecting into overlying relation to the gun for supporting the forward end of the telescope sight, an arm integral with the rearwardly extending end of the frame and projecting laterally therefrom, the outer end of said arm being dimensioned to receive the rear end of the telescope sight and including a threaded bore having its axis parallel with the axis of said screw, a movable clamp, and a screw fitting in said bore and connecting said clamp to said arm for securing the rear end of said sight in substantially fixed position.

3. The combination in a telescope gun-sight mount, comprising a frame and means for attaching the frame to the gun, means on one end of said frame for supporting one end of the telescope sight, an arm projecting laterally from said frame spaced from said last mentioned means and providing a cradle for the opposite end of the telescope sight, there being an aperture in the frame near the base of said arm, a flexible clamp having one end passing through said aperture and including means for preventing passage of said end through said aperture, and a screw connecting the opposite end of said clamp to the outer end of said arm for securing the telescope sight in relatively fixed position in said cradle.

4. The combination in a telescope gun-sight mount, comprising a frame and means for adjustably securing the frame to a gun, supporting means on said frame for carrying the forward end of the telescope sight, an arm spaced from said supporting means and projecting laterally from the frame, an internally threaded boss at the outer end of said arm, a projection formed on the inner face of said arm and forming together with said boss a cradle for receiving the rear end of the telescope sight, and a movable clamp having a connecting screw threaded in said boss for securing the rear end of the telescope sight in relatively fixed position in said cradle.

5. The combination in a telescope gun-sight mount, comprising a base for attachment to the gun and a frame including means coacting with said base for securing the frame thereto, said frame having forwardly and rearwardly extending parts, means on the forwardly extending part of said frame for supporting the forward end of the telescope sight, an arm having one end integral with the rearwardly extending part of said frame and its opposite end overlying the receiver of the gun, said arm having a hollow inner face opposing the receiver of the gun and including a rib on said inner face providing a projection spaced from the outer end of the arm and extending laterally of the gun, said rib forming together with the outer end of the arm a cradle for receiving the telescope sight, and a movable clamp coacting with said arm for maintaining the telescope sight in relatively fixed position in said cradle.

6. The combination in a telescope gun-sight mount, comprising a base for attachment to the gun and a frame including a plurality of parts integrally related thereto, one of said parts having means for connecting the frame to said base, other of said parts including means for supporting one end of a telescope sight tube and an arm projecting into overlying relation to the gun for supporting the opposite end of the tube, and a removable clamp coacting with said arm to secure the tube against the under side of said arm.

7. In combination in a telescope gun-sight mount comprising a frame including means for attachment to the gun, a part extending laterally from the frame for supporting one end of a telescope sight and having means for moving said one end laterally or vertically for respectively windage or elevational adjustments, a cradle arm in spaced relation to said part and extending laterally in a similar direction for supporting the opposite end of the telescope sight, said arm having two portions projecting from the plane of the inner face of the arm and providing limited contact with the periphery of the telescope sight at points spaced circumferentially ninety degrees more or less, and means for maintaining the telescope sight snugly in position on said cradle arm but permitting pivotal movement of the telescope sight on said contact points incident to said adjustments at said one end.

8. The combination in a telescope gun-sight mount, comprising a frame having an integral slide along one side and integral spaced telescope sight supports along the opposite side, means coacting with said supports for connecting the telescope sight thereto and for adjusting one end of the telescope sight vertically and laterally, and means attachable to the gun and engageable by said slide to support said frame with said telescope sight longitudinally disposed relative to the gun.

9. In a gun-sight mount of the character described, the combination of a frame including a supporting member having an elongated undercut groove, an elongated base adapted to be secured permanently to the barrel of a gun and having a shape complementary to said groove to receive said supporting member only by relative sliding movement, said base including hardened means having outwardly opening counterbores spaced longitudinally of said base, and tightening screws carried by said supporting member and having hardened ends engageable in said counterbores to lock said support member in position on said base.

10. In a gun-sight mount of the character described, the combination of a base for attachment to a gun, a frame including a supporting member complementally arranged for sliding engagement with said base, tightening screws threadedly carried by said supporting member and having tapered ends projecting toward said base, and tapered counterbores in said base opening outwardly to receive said tapered ends of said screws, said counterbores and said screws having a slightly offset relationship so that said tapered ends coact with the walls defining said counterbores with tight wedging effect to secure said supporting member fixedly to said base.

11. In a gun-sight mount of the character described, in combination, a frame including means on one side for receiving and supporting a sight, a base comprising a narrow elongated bar attachable to and arranged to project radially from the receiver of a gun, said base providing a track along the side thereof opposite that which is adapted for engagement with the receiver, said frame having a part arranged to face toward the receiver of the gun and being complementally shaped for engagement with said track to enable attachment of said frame by a sliding motion longitudinally of the base bar, said base bar having a bore opening from the track side thereof, and a threaded element carried by said frame movable axially toward said track side and being engageable endwise within said bore after attachment of the frame to the base to lock the frame and base against relative movement.

12. A gun-sight mount of the character described comprising, in combination, an elongated base arranged for attachment beside the receiver of a gun, a frame including means for supporting a sight, said base and said frame being complementally formed to provide an undercut groove and track arranged for sliding interengagement, said base having a bore opening toward the interchanging part of the frame, and a tightening screw carried by said frame for movement axially toward said base for engagement at its inner end within said bore, the axes of said bore and said screw being relatively offset whereby the inner end of the screw will coact wedgingly with the wall defining said bore to effect a lateral jamming interengagement between the frame and the base.

OLE HORSRUD.

CERTIFICATE OF CORRECTION.

Patent No. 2,073,210.　　　　　　　　　　　　　　　　　　　March 9, 1937

OLE HORSRUD.

It is hereby certified that error appears in the printed specification of the above numbered patent requiring correction as follows: Page 4, second column, lines 17 and 18, claim 12, for the word "interchanging" read interengaging; and that the said Letters Patent should be read with this correction therein that the same may conform to the record of the case in the Patent Office.

Signed and sealed this 11th day of May, A. D. 1937.

(Seal)　　　　　　　　　　　　　　　　　　　　　　　Henry Van Arsdale
　　　　　　　　　　　　　　　　　　　　　　　　Acting Commissioner of Patents.